(12) United States Patent
Wu et al.

(10) Patent No.: US 7,586,568 B2
(45) Date of Patent: Sep. 8, 2009

(54) LIQUID CRYSTAL DISPLAY PANEL AND LIQUID CRYSTAL DISPLAY DEVICE INCORPORATING THE SAME

(75) Inventors: Yi-Chun Wu, Hualien (TW); Chien-Chang Lee, Taichung (TW)

(73) Assignee: Wintek Corporation, Taichung (TW)

( * ) Notice: Subject to any disclaimer, the term of this patent is extended or adjusted under 35 U.S.C. 154(b) by 218 days.

(21) Appl. No.: 11/905,777

(22) Filed: Oct. 4, 2007

(65) Prior Publication Data
US 2008/0094553 A1    Apr. 24, 2008

(30) Foreign Application Priority Data
Oct. 19, 2006    (TW) .............................. 95138631 A (51) Int. Cl.
*G02F 1/1335* (2006.01)
*G02F 1/1337* (2006.01)

(52) U.S. Cl. .......................... 349/114; 349/129; 349/61

(58) Field of Classification Search ................. 349/114, 349/129, 61
See application file for complete search history.

(56) References Cited

U.S. PATENT DOCUMENTS

| | | | |
|---|---|---|---|
| 6,922,219 B2* | 7/2005 | Jin et al. ..................... | 349/113 |
| 6,950,158 B2* | 9/2005 | Chang ......................... | 349/114 |
| 6,961,107 B2* | 11/2005 | Liao et al. .................... | 349/124 |
| 7,046,322 B2* | 5/2006 | Tsuchiya ...................... | 349/114 |
| 7,256,846 B2* | 8/2007 | Maeda ......................... | 349/114 |
| 7,259,816 B2* | 8/2007 | Higa ........................... | 349/114 |
| 7,391,489 B2* | 6/2008 | Kume et al. .................. | 349/129 |

* cited by examiner

*Primary Examiner*—Mike Qi
(74) *Attorney, Agent, or Firm*—Bacon & Thomas, PLLC (57) ABSTRACT

A liquid crystal display (LCD) panel and an LCD device incorporating the same are provided. The LCD panel includes a first substrate, a second substrate and a liquid crystal layer. The second substrate disposed parallel to the first substrate includes a base, a picture element, a transparent electrode, several stack layers and several reflective electrodes. The picture element having a transmission region and a reflection region is disposed on the base. The transparent electrode having several electrode portions is disposed inside the picture element. The electrode portions are alternatedly disposed in the transmission region. The stack layers alternatedly disposed on part of the transparent electrode alternate with the electrode portions. The reflective electrodes are correspondingly disposed on the top surfaces of the stack layers, and are electrically connected to the transparent electrode. The liquid crystal molecules form several domains via the lateral inclined surfaces of the stack layers.

19 Claims, 5 Drawing Sheets

LIQUID CRYSTAL DISPLAY PANEL AND LIQUID CRYSTAL DISPLAY DEVICE INCORPORATING THE SAME

This application claims the benefit of Taiwan application Serial No. 95138631, filed Oct. 19, 2006, the subject matter of which is incorporated herein by reference.

BACKGROUND OF THE INVENTION

1. Field of the Invention

The invention relates in general to a liquid crystal display (LCD) panel and an LCD device incorporating the same, and more particularly to an LCD device guiding the liquid crystal molecules to form multi domains by alternatedly disposing the stack layers and an LCD panel incorporating the same.

2. Description of the Related Art

With the advance in science and technology, LCD devices such as twist nematic (TN) type LCD device and super twist nematic (STN) type LCD device, having the features of slimness, lightweight, compactness and portability, have been widely used in mobile phone and personal digital assistant.

When no cross-voltage is applied to a conventional twist nematic type LCD device, the liquid crystal molecules of the conventional twist nematic type LCD device will be twisted and the polarization of light will be changed. Meanwhile, the LCD device is normally white (NW) and displays in bright mode. After a cross-voltage is applied to the twist nematic type LCD device, the liquid crystal molecules will be rotated and vertically arranged, and the polarization of light will not be changed. Meanwhile, the LCD device displays in dark mode.

However, the viewing angle of the conventional twist nematic type LCD device is narrow, and a viewer will not see the frame when viewing the twist nematic type LCD device sideways. Therefore, how to develop an LCD device with wide viewing angle has become an important issue.

SUMMARY OF THE INVENTION

The invention is directed to a liquid crystal display (LCD) device guiding the liquid crystal molecules to form multi domains by alternatedly disposing the stack layers and an LCD panel incorporating the same. With the lateral inclined surface of the stack layer disposed on the transparent electrode and the alternating disposition of the stack layers, multi-domain alignment is achieved and the viewing angle is widened. With the design that the edge of the stack layer is not covered by the reflective electrodes, the position of the disclination is adjusted, such that the disclination is shifted to the inclined surface of the stack layer and the aperture rate of the display area is increased. Furthermore, the design of forming the reflective electrodes on the stack layer enables the LCD device to be transflective. Thus, the visibility of the LCD device is improved both indoors and outdoors, largely increasing the practicality of the LCD device.

According to a first aspect of the present invention, an LCD panel including a first substrate, a second substrate and a liquid crystal layer is provided. The second substrate is parallel to the first substrate and includes a base, a picture element, a transparent electrode, several stack layers and several reflective electrodes. The picture element having a transmission region and a reflection region is disposed on the base. The transparent electrode having several electrode portions is disposed inside the picture element. The electrode portions are alternatedly disposed in the transmission region. The stack layers are alternatedly disposed on part of the transparent electrode and alternate with the electrode portions in the reflection region. The reflective electrodes are correspondingly disposed on the top surfaces of the stack layers, and are electrically connected to the transparent electrode. The liquid crystal layer having several liquid crystal molecules is disposed between the first substrate and the second substrate. The liquid crystal molecules form several domains via the lateral inclined surfaces of the stack layers.

According to a second aspect of the present invention, an LCD device including a backlight module, a first polarizer, an LCD panel and a second polarizer is provided. The first polarizer is disposed on the backlight module. The LCD panel is disposed on the first polarizer, and includes a first substrate, a second substrate and a liquid crystal layer. The second substrate is parallel to the first substrate, and includes a base, a picture element, a transparent electrode, several stack layers and several reflective electrodes. The picture element having a transmission region and a reflection region is disposed on the base. The transparent electrode having several electrode portions is disposed inside the picture element. The electrode portions are alternatedly disposed in the transmission region. The stack layers are alternatedly disposed on part of the transparent electrode and alternate with the electrode portions in the reflection region. The reflective electrodes are correspondingly disposed on the top surfaces of the stack layers, and are electrically connected to the transparent electrode. The liquid crystal layer having several liquid crystal molecules is disposed between the first substrate and the second substrate. The liquid crystal molecules form several domains via the lateral inclined surfaces of the stack layers. The second polarizer is disposed on the LCD panel.

The invention will become apparent from the following detailed description of the preferred but non-limiting embodiments. The following description is made with reference to the accompanying drawings.

DETAILED DESCRIPTION OF THE INVENTION

First Embodiment

Figure 1:
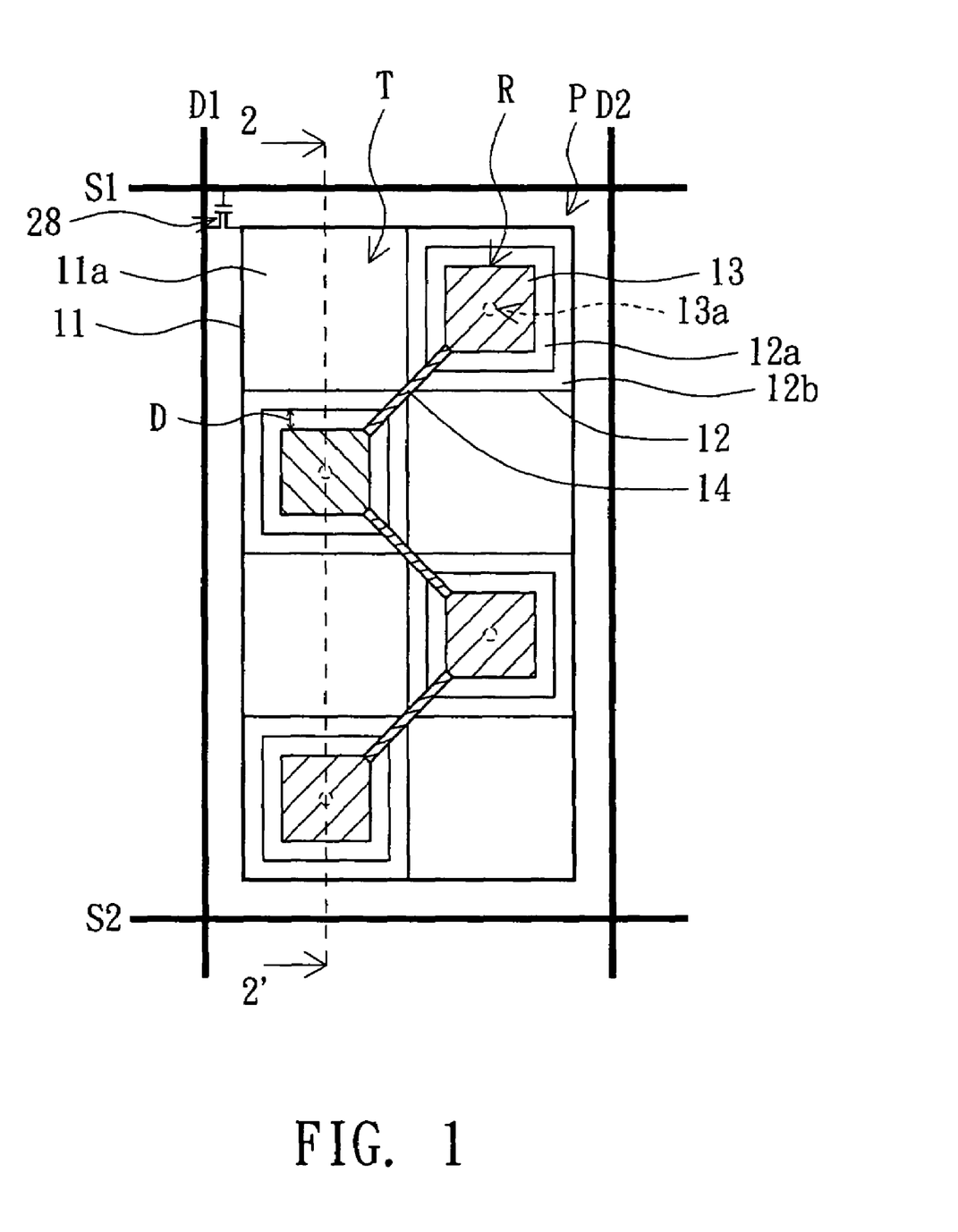
FIG. 1 is a top view of circuit configuration on a substrate of an LCD panel according to a first embodiment of the invention.
Figure 2:
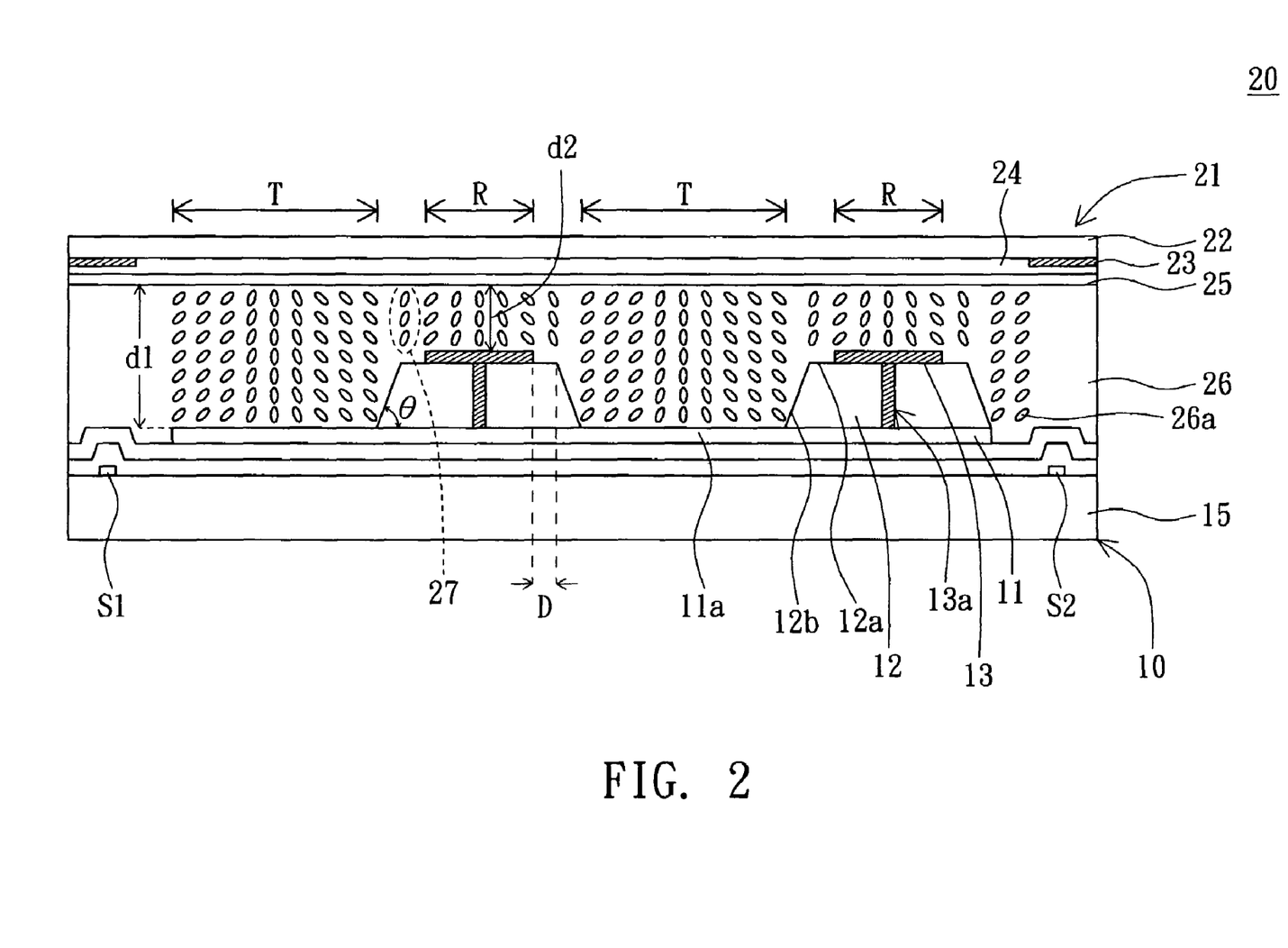
FIG. 2 is a cross-sectional view of the other LCD panel formed by the substrate, the liquid crystal layer and the other substrate viewed along the cross-sectional line 2-2' of FIG. 1.

Refer to FIGS. 1-2. FIG. 1 is a top view of circuit configuration on a substrate of an LCD panel according to a first embodiment of the invention. FIG. 2 is a cross-sectional view of the other LCD panel formed by the substrate, the liquid crystal layer and the other substrate viewed along the cross-sectional line 2-2' of FIG. 1. As indicated in FIGS. 1-2, the LCD panel 10 at least includes a first substrate 21, a second substrate 10 and a liquid crystal layer 26. The second substrate 10, parallel to the first substrate 21 and coupled thereto via a sealant for example, includes a base 15, a picture element P, a transparent electrode 11, several stack layers 12 and several reflective electrodes 13. The picture element P, such as a sub-pixel of an active matrix pixel array, is disposed on the base 15 and has a transmission region T and a reflection region R. The transparent electrode 11 is disposed inside the picture element P and has several electrode portions 11a facilitating the light to pass through. The electrode portions 11a are alternatedly disposed in the transmission region T. The stack layers 12, alternatedly disposed on part of the transparent electrode 11 and in the reflection region R, alternate with the electrode portions 11a. The reflective electrodes 13 are correspondingly disposed on the top surfaces 12a of the stack layers 12 and are electrically connected to the transparent electrode 11 for reflecting the light. The liquid crystal layer 26 having several liquid crystal molecules 26a is disposed between the first substrate 21 and the second substrate 10. The liquid crystal molecules 26a form several domains via the lateral inclined surfaces 12b of the stack layers 12, wherein at least four domains are formed. A domain refers to an area covered by the liquid crystal molecules 26a tilted toward the same direction, and more than one domain will be formed if the liquid crystal molecules are tilted toward different directions.

In the present embodiment of the invention, each stack layer 12 has a contact hole 13a, and each reflective electrode 13 is electrically connected to the transparent electrode 11 disposed thereunder via the corresponding contact hole 13a. Besides, the second substrate 10 further includes several conductive channel layers 14, each conductive channel layer 14 used for electrically connecting two adjacent reflective electrodes 13, for example, by connecting corners of the two adjacent reflective electrodes 13. The conductive channel layer 14 is raised above the reflective electrodes 13 by the corners of the two adjacent stack layers 12. Furthermore, given that each reflective electrode 13 is electrically connected to the transparent electrode 11 via the corresponding contact hole 13a, the present embodiment of the invention can omit the complete structure or part of the structure of the conductive channel layer 14. Moreover, given that each conductive channel layer 14 electrically connects two adjacent reflective electrodes 13, the present embodiment of the invention only needs to hollow one stack layer 12 and form at least one contact hole 13a via which one reflective electrode 13 is electrically connected to the transparent electrode 11. Further, the picture element P can be square-shaped, each stack layer 12 is square-shaped, and a first corner of one of the stack layers 12 is correspondingly connected to a first corner of another adjacent one of the stack layers 12. Thus, the stack layers 12 is disposed in the picture element P in a zigzag shaped and so are the electrode portions 11a arranged in the same way.

As indicated in FIG. 2, the edge of the reflective electrodes 13 is shrinked back a distance D with respect to the edge of the top surface 12a of the stack layer 12, wherein the distance D is approximately 1 μm-6 μm. With the design that the edge of the top surface 12a of the stack layer 12 does not cover the reflective electrodes 13, the electrical field of the LCD panel 20 is severely changed, hence enhancing the alignment of the liquid crystal molecules 26a. Therefore, the overall response rate of the LCD panel 20 is increased, and the disclination 27 is controlled to be at the edge of the top surface 12a of the stack layer 12. Consequently, the area of the disclination 27 is reduced in the transmission region T, and the transmission rate will not be decreased by the disclination 27. The disclination 27 means the area where the arrangement of the liquid crystal molecules 26a is discontinuous. The liquid crystal molecules 26a disposed to the right hand side of the disclination 27 are tilted to the right and form a domain, while liquid crystal molecules 26a disposed to the left hand side of the disclination 27 are tilted to the left and form another domain. Besides, the part of the liquid crystal layer 26 corresponding to the transmission region T has a first thickness d1 and the part of the liquid crystal layer 26 corresponding to the reflection region R has a second thickness d2, and the ratio of the first thickness d1 to the second thickness d2 ranges from 1.8:1 to 2.2:1, resulting in better reflection effect. Besides, the lateral inclined surface 12b of each stack layer 12 forms an inclined angle θ with respect to the surface of the base 15, wherein the inclined angle θ is approximately 30 to 60 degrees. In the present embodiment of the invention, the inclined angle θ is controlled to be within the range of 30 to 60 degrees, such that the tilting direction of the liquid crystal molecules 26a in the reflection region R is opposite to that in the transmission region T, hence forming different domains.

As indicated in FIG. 1, the second substrate 10 further includes a first scan line S1, a second scan line S2, a first data line D1 and a second data line D2, wherein the first scan line S1 and the second scan line S2 are disposed on the base 15 in parallel, and so are the first data line D1 and the second data line D2 disposed on the base 15 in parallel. The first scan line S1 and the second scan line S2 vertically and alternatedly define the above picture element P with the first data line D1 and the second data line D2. Moreover, the second substrate 10 further includes a thin film transistor (TFT) 28 and a storage capacitor (not illustrated in the diagram) in the picture element P, wherein the TFT 28 is electrically connected to the first scan line S1 and the first data line D1 respectively, the two electrode boards of the storage capacitor are electrically connected to a electrode line having fixed voltage and the transparent electrode 11 correspondingly. Furthermore, the TFT 28 and the storage capacitor can be disposed between the stack layer 12 and the base 15 and within the reflection region R so as to increase the aperture rate of the LCD panel 20 and the visible area.

Any one who is skilled in the technology of the present embodiment of the invention will understand that the technology of the present embodiment of the invention is not limited to the above disclosure and exemplification. For example, the reflective electrodes 13 may include a reflective metal, a reflective alloy or a combination thereof, such as silver or aluminum. The transparent electrode 11 may include a transparent conductive material, such as indium tin oxide (ITO) or indium zinc oxide (IZO). The liquid crystal layer 26 further has a rotating agent, such as chiral dopants, for assisting the rotation of the liquid crystal molecules 26. Once the liquid crystal molecules 26 are rotated, the disclination will change, become slender or even disappear, such that the deterioration in the transmission rate caused by the disclination is mitigated or even prevented. The first substrate 21 and the second substrate 10 are respectively a color filter substrate and a TFT substrate. As indicated in FIG. 2, the first substrate 21 exemplified by a color filter substrate includes a base 22, a black matrix 23, a color filter 24 and a common electrode 25. The black matrix 23 is disposed on part of the base 22 and corresponds to the first scan line S1, the second scan line S2, the first data line D1, the second data line D2 and the TFT 28. The color filter 24 is disposed on the base 22 and covers the black matrix 23 so as to correspond to the picture element P. The common electrode 25 is disposed on the color filter 24. The common electrode 25 and the electrode portion 11a and the reflective electrodes 13 control the alignment of the liquid crystal molecules 26a together when a cross-voltage is applied thereto. FIG. 2 shows the alignment of the liquid crystal molecules 26a when a cross-voltage is applied to the electrode portion 11a, the reflective electrodes 13 and the common electrode 25. As the liquid crystal molecules 26a tilt toward different directions, different domains are formed accordingly. The material of the conductive channel layer 14 is the same or different with that of the reflective electrodes 13. The stack layers 12 include an organic material or an inorganic material. The bases 15 and 22 include transparent substrates such as glass substrates, insulating substrates, plastic substrates or flexible substrates.

During the process of manufacturing the second substrate 10, first, the first scan line S1, the second scan line S2, the second data line D1, the second data line D2, the TFT 28, the storage capacitor and the transparent electrode 11 are formed on the base 15 according to the TFT array process, then the alternated stack layers 12 are developed on the transparent electrode 11 to form two, four, six or eight stack layers 12. In the present embodiment of the invention, four stack layers 12 are formed. Next, a reflective material such as silver or aluminum is coated on the stack layers 12 to form a plurality of reflective electrodes 13. For the reflective electrodes 13 to have the same electric potential with the transparent electrode 11, the center of each stack layer 12 is hollowed to form a contact hole 13a via which the reflective electrodes 13 is electrically connected to the transparent electrode 11 disposed thereunder. Or, only one of the stack layers 12 is hollowed to form a contact hole 13a, and a conductive channel layer 14 is formed at the same time with the reflective electrodes 13, such that all of the reflective electrodes 13 can be electrically connected via the conductive channel layer 14. Therefore, in the present embodiment of the invention, the transparent electrode 11 is formed on the base 15 first, then the stack layers 12 are formed next. The stack layers 12 are alternatedly disposed so as to divide the picture element P into several regions. With the lateral inclined surface 12b of the stack layer 12, the vertically arranged liquid crystal molecules 26a are further aligned to achieve multi-domain effect.

Second Embodiment

Figure 3:
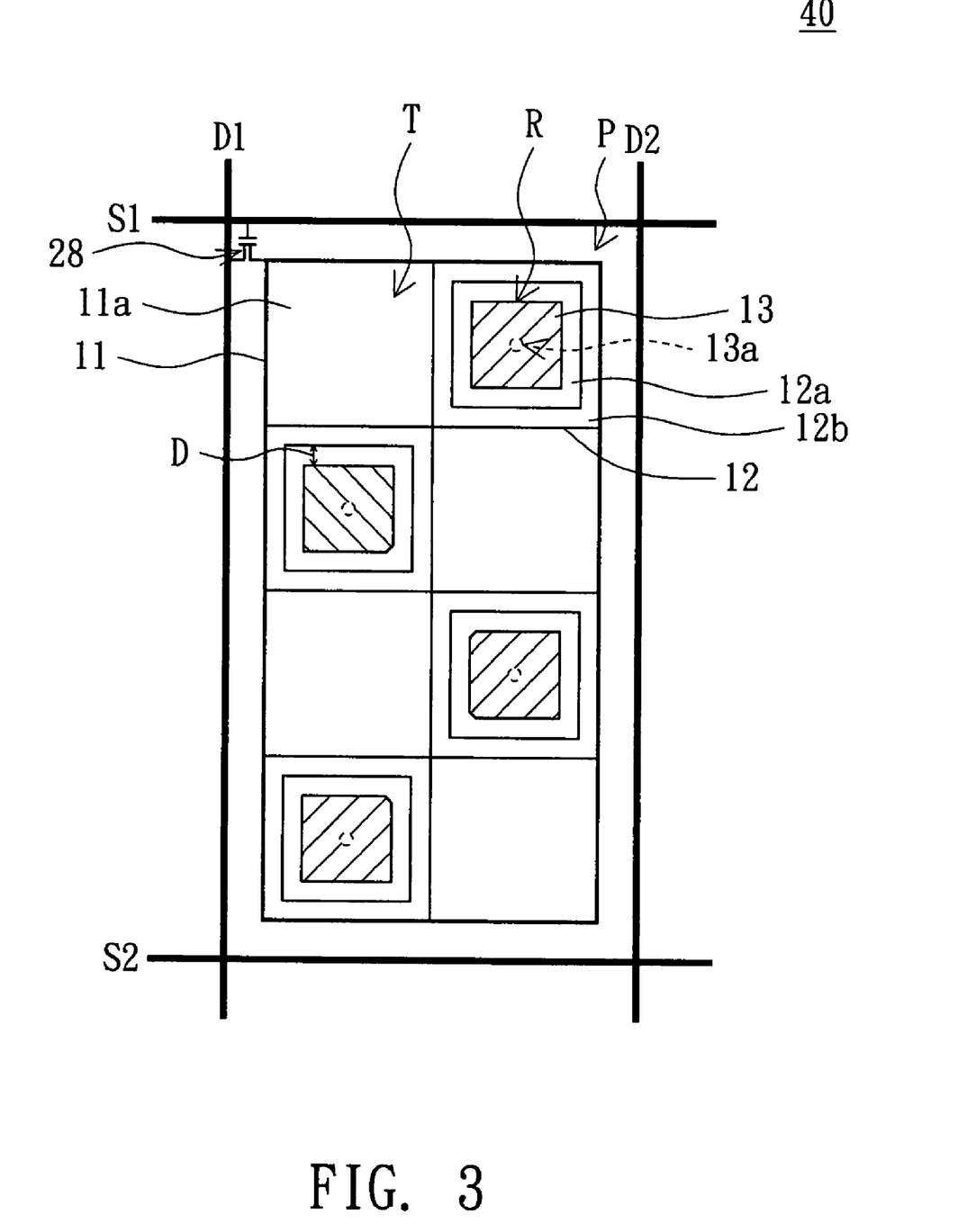
FIG. 3 is a top view of circuit configuration on a substrate of an LCD panel according to a second embodiment of the invention.

Referring to FIG. 3, a top view of circuit configuration on a substrate of an LCD panel according to a second embodiment of the invention is shown. The LCD panel 40 of the present embodiment of the invention differs with the LCD panel 10 of the first embodiment in that the conductive channel layer 14 is omitted. As for other similar elements, the same numeric designations are used and are not repeated here. As indicated in FIG. 3, each stack layer 12 has a contact hole 13a, and each reflective electrode 13 disposed on the stack layer 12 is electrically connected to the transparent electrode 11 disposed thereunder via the corresponding contact hole 13a. Therefore, the interspaced and alternated reflective electrodes 13 are seemingly isolated in appearance, but are actually electrically connected to the transparent electrode 11 via the contact hole 13a.

Third Embodiment

Figure 4:
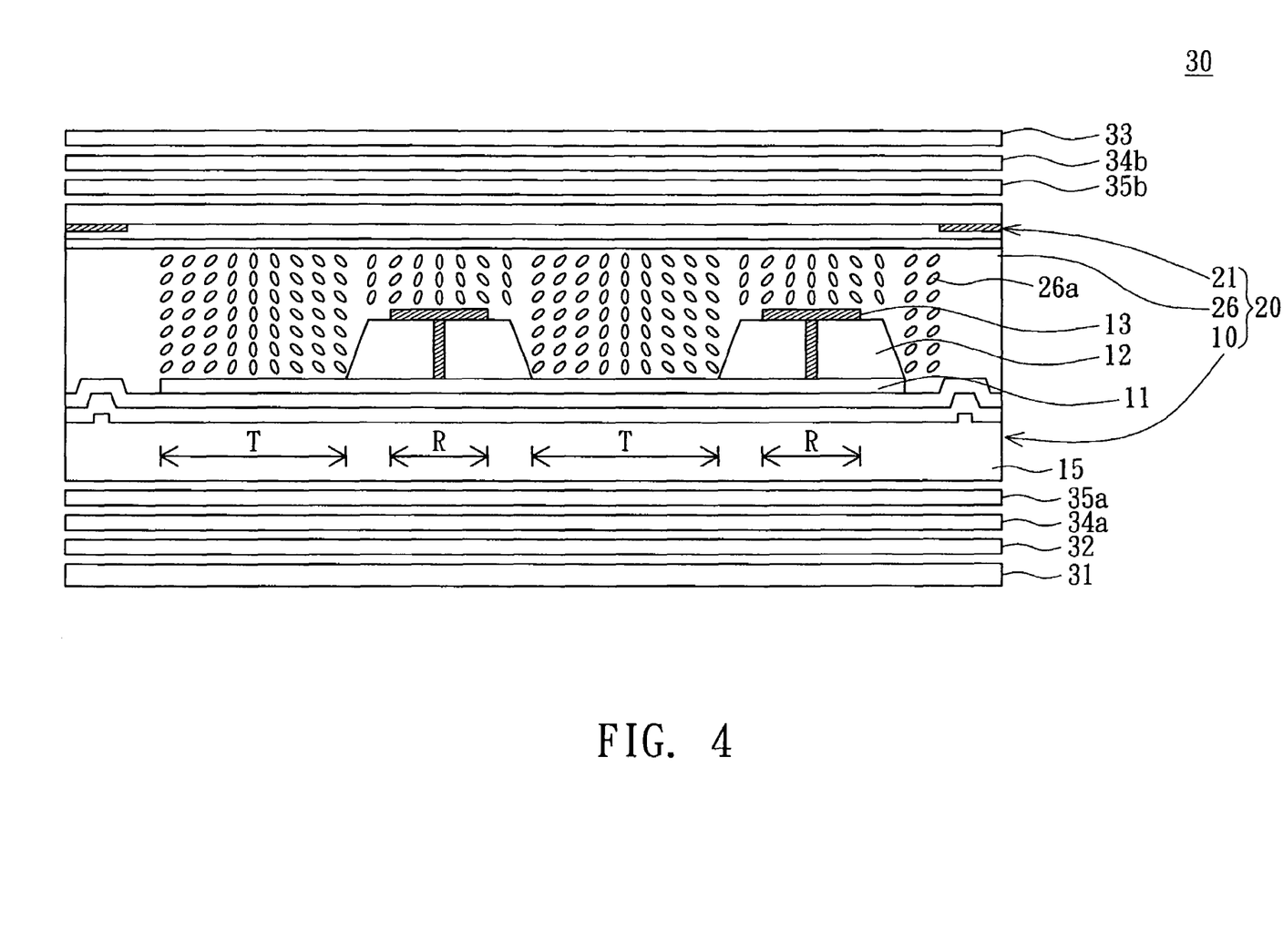
FIG. 4 is a cross-sectional view of an LCD according to a third embodiment of the invention.

Referring to FIG. 4, a cross-sectional view of an LCD according to a third embodiment of the invention is shown. As indicated in FIG. 4, the LCD device 30 includes a backlight module 31, a first polarizer 32, a second polarizer 33 and an LCD panel 20 or 40, wherein the LCD panel 20 is exemplified here. The first polarizer 32 is disposed between the backlight module 31 and the LCD panel 20. The LCD panel 20 is disposed on the first polarizer 32. The second polarizer 33 is disposed on the LCD panel 20. The LCD device 30 is a transflective LCD device and is exemplified by a vertical alignment (VA) LCD device in the present embodiment of the invention. The VA type LCD device is a normally black (NB) LCD device.

In the present embodiment of the invention, the LCD device 30 further includes a first compensation film 34a, a second compensation film 34b, a third compensation film 35a and a fourth compensation film 35b. The first compensation film 34a and the third compensation film 35a are disposed between the first polarizer 32 and LCD panel 20, and the third compensation film 35a is disposed between the first compensation film 34a and LCD panel 30. That is, the third compensation film 35a and the first compensation film 34a are respectively adjacent to LCD panel 20 and the first polarizer 32. The fourth compensation film 35b and the second compensation film 34b are disposed between the LCD panel 20 and the second polarizer 33, and the fourth compensation film 35b is disposed between the second compensation film 34b and the LCD panel 20. That is, the fourth compensation film 35b and the second compensation film 34b are respectively adjacent to the LCD panel 20 and the second polarizer 33. Besides, the first compensation film 34a and the second compensation film 34b can be two planar phase retardation compensating films (A plates) or two biaxial phase retardation compensating films (biaxial films), wherein the planar phase retardation compensating films (A plates) can be two $\lambda/4$ wave plates. Moreover, the third compensation film 35a and the fourth compensation film 35b are two vertical phase retardation compensating films (C plates), wherein the optical axis of the planar phase retardation compensating film (A plate) is parallel to the surface of the base 15 for adjusting the property of the reflection region R corresponding to the reflective electrodes 13 from normally white (NW) to normally black (NB). The optical axis of the C plate is perpendicular to the surface of the base 15 for compensating the light leakage occurring in dark state at wide viewing angle so as to improve the contrast and reduce the color instauration. The optical transmission axis of the first polarizer 32 is perpendicular to that of the second polarizer 33. The optical axes of the second compensation film 34b and the first compensation film 34a form a contained angle of 45 degrees with the optical transmission axes of the first polarizer 32 and the second polarizer 33. For example, if the optical transmission axis of the first polarizer 32 and that of the second polarizer 33 are respectively orientated at 0 and 90 degrees, then the optical axis of the second compensation film 34b and that of the first compensation film 34a are respectively orientated at 45 and −45 degrees.

Fourth Embodiment

Figure 5:
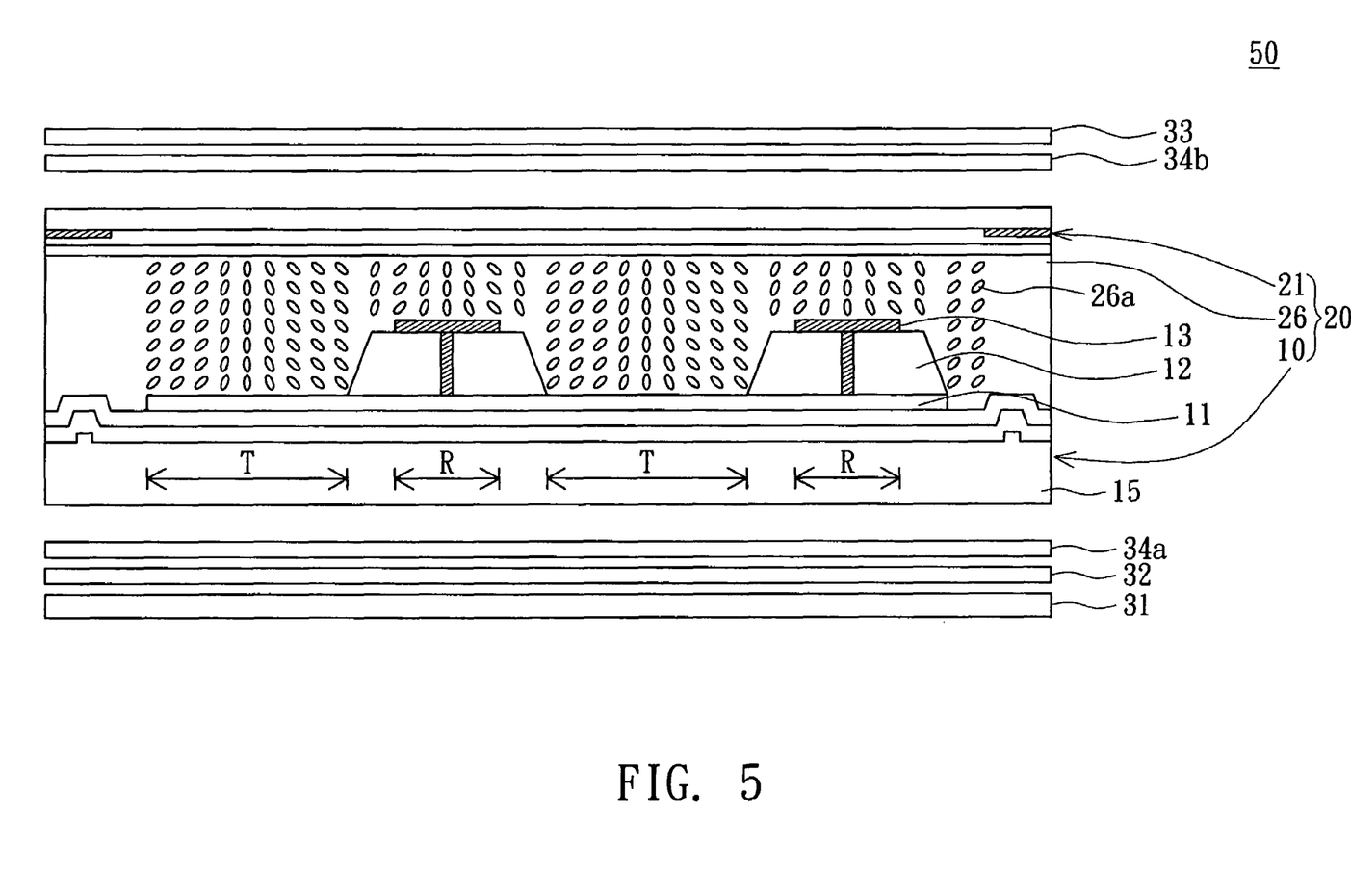
FIG. 5 is a cross-sectional view of an LCD according to a fourth embodiment of the invention.

Referring to FIG. 5, a cross-sectional view of an LCD according to a fourth embodiment of the invention is shown. The LCD device 50 of the present embodiment of the invention differs with the LCD device 30 of the third embodiment in that the third compensation film 35a and the fourth compensation film 35b are omitted. As for other similar elements, the same numeric designations are used and are not repeated here. The first compensation film 34a and the second compensation film 34b are two planar phase retardation compensating films (A plates) or two biaxial phase retardation compensating films (biaxial films), wherein the two planar phase retardation compensating films (A plates) can be $\lambda/4$ wave plates.

According to the LCD panel and the LCD device incorporating the same disclosed in the above embodiments of the invention, with the lateral inclined surface of the stack layer disposed on the transparent electrode and the alternating disposition of the stack layers, multi-domain alignment is achieved and the viewing angle is widened. With the design that the edge of the stack layer is not covered by the reflective electrodes, the position of the disclination is adjusted, such that the disclination is shifted to the inclined surface of the stack layer and the aperture rate of the display area is increased. Furthermore, the design of forming the reflective electrodes on the stack layer enables the LCD device to be transflective. Thus, the visibility of the LCD device is improved both indoors and outdoors, largely increasing the practicality of the LCD device.

Therefore, the invention provides a transflective LCD device having a wide viewing angle. The lateral inclined surfaces of the stack layers are alternatedly disposed such that the liquid crystal molecules are guided to achieve multi-domain effect as well as wide viewing angle effect and transflective effect. By alternatedly disposing a single and complete reflective electrode on a stack layer, the inclined surfaces of the stack layers can align the liquid crystal molecules. With the design that the edge of the stack layer is not covered by the reflective electrodes, the position of the disclination is adjusted, such that the disclination is shifted to the inclined surface of the stack layer. Consequently, the aperture rate of the display area is increased and a multi-domain and wide viewing angle display effect is achieved.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
    a first substrate;
    a second substrate parallel to the first substrate, the second substrate comprising:
        a base;
        a picture element disposed on the base, wherein the picture element has a transmission region and a reflection region;
        a transparent electrode disposed inside the picture element, wherein the transparent electrode has a plurality of electrode portions which are alternatedly disposed in the transmission region;
        a plurality of stack layers alternatedly disposed on part of the transparent electrode and in the reflection region, wherein the stack layers alternate with the electrode portions; and
        a plurality of reflective electrodes correspondingly disposed on the top surfaces of the stack layers and electrically connected to the transparent electrode; and
    a liquid crystal layer disposed between the first substrate and the second substrate, wherein the liquid crystal layer has a plurality of liquid crystal molecules forming a plurality of domains via the lateral inclined surfaces of the stack layers.

2. The LCD panel according to claim 1, wherein the edge of the reflective electrodes is shrinked back 1-6 μm with respect to the edge of the top surface of the stack layer.

3. The LCD panel according to claim 1, wherein each stack layer has a contact hole via which each reflective electrode is electrically connected to the transparent electrode.

4. The LCD panel according to claim 3, wherein the second substrate further comprises a plurality of conductive channel layers, each of the conductive channel layers electrically connecting two adjacent reflective electrodes.

5. The LCD panel according to claim 1, wherein the part of the liquid crystal layer corresponding to the transmission region has a first thickness and the part of the liquid crystal layer corresponding to the reflection region has a second thickness, the ratio of the first thickness to the second thickness ranging from 1.8:1 to 2.2:1.

6. The LCD panel according to claim 1, wherein the inclined angle formed by the lateral inclined surface of each stack layer with respect to the surface of the base ranges from 30 to 60 degrees.

7. The LCD panel according to claim 1, wherein each stack layer is squared, and a first corner of one of the stack layer is correspondingly connected to a first corner of another adjacent one of the stack layers.

8. A liquid crystal display (LCD) panel, comprising:
    a backlight module;
    a first polarizer disposed above the backlight module;
    an LCD panel disposed on the first polarizer, the LCD panel comprising:
        a first substrate;
        a second substrate disposed parallel to the first substrate, the second substrate comprising:
            a base;
            a picture element disposed on the base, wherein the picture element has a transmission region and a reflection region;
            a transparent electrode disposed inside the picture element, wherein the transparent electrode has a plurality of electrode portions alternatedly disposed in the transmission region; and
            a plurality of stack layers alternatedly disposed on part of the transparent electrode and in the reflection region, wherein the stack layers alternate with the electrode portions; and
            a plurality of reflective electrodes correspondingly disposed on the top surfaces of the stack layers and electrically connected to the transparent electrode; and
        a liquid crystal layer disposed between the first substrate and the second substrate, wherein the liquid crystal layer has a plurality of liquid crystal molecules, which form a plurality of domains via the lateral inclined surfaces of the stack layers; and
    a second polarizer disposed on the LCD panel.

9. The LCD device according to claim 8, further comprising:
    a first compensation film disposed between the first polarizer and the LCD panel; and
    a second compensation film disposed between the LCD panel and the second polarizer.

10. The LCD device according to claim 9, wherein the first compensation film and the second compensation film are two planar phase retardation compensating films.

11. The LCD device according to claim 10, wherein the two planar phase retardation compensating films are two λ/4 wave plates.

12. The LCD device according to claim 9, wherein the first compensation film and the second compensation film are two biaxial phase retardation compensating films.

13. The LCD device according to claim 8, further comprising:
    a third compensation film disposed between the first compensation film and the LCD panel; and
    a fourth compensation film disposed between the LCD panel and the second compensation film.

14. The LCD device according to claim 13, wherein the third compensation film and the fourth compensation film are two vertical phase retardation compensating films (C plates).

15. The LCD device according to claim 8, wherein the edge of the reflective electrode is shrinked back 1 μm-6 μm with respect to the edge of the top surface of the stack layer.

16. The LCD device according to claim 8, wherein each stack layer having a contact hole via which each of the reflective electrodes is electrically connected to the transparent electrode.

17. The LCD device according to claim 16, wherein the second substrate further comprises a plurality of conductive channel layers, each of the conductive channel layers electrically connecting two adjacent reflective electrodes.

18. The LCD device according to claim 8, wherein the part of the liquid crystal layer corresponding to the transmission region has a first thickness and the part of the liquid crystal layer corresponding to the reflection region has a second thickness, the ratio of the first thickness to the second thickness ranging from 1.8:1 to 2.2:1.

19. The LCD device according to claim 8, wherein each stack layer is squared, and a first corner of one of the stack layers is correspondingly connected to a first corner of another adjacent one of the stack layers.

* * * * *